United States Patent [19]

Cameron

[11] Patent Number: 4,916,946
[45] Date of Patent: Apr. 17, 1990

[54] METHOD OF FLOWING A HIGH VISCOSITY SUBSTANCE THROUGH A CONDUIT AT A LOW APPARENT VISCOSITY

[75] Inventor: John R. Cameron, Broken Arrow, Okla.

[73] Assignee: Amoco Corporation, Chicago, Ill.

[21] Appl. No.: 327,942

[22] Filed: Mar. 23, 1989

[51] Int. Cl.$^4$ ............................................. E21B 43/267
[52] U.S. Cl. ..................................... 73/155; 166/250; 166/308
[58] Field of Search ................... 73/151, 155; 166/275, 166/281, 282, 308, 250; 252/8.551, 8.554

[56] References Cited

U.S. PATENT DOCUMENTS 4,442,897  4/1984  Crowell ................................ 166/308
4,502,967  3/1985  Conway ................................ 166/308

Primary Examiner—Hezron E. Williams
Assistant Examiner—Kevin D. O'Shea
Attorney, Agent, or Firm—Scott H. Brown; Fred E. Hook

[57] ABSTRACT

A method of flowing a high viscosity substance, such as a delayed cross-linked fracturing gel, through a conduit or well fracture at a low apparent viscosity comprises selecting a cross-linkable fluid having nonhomogeneous flow properties and flowing the fluid through the conduit or well fracture at fluid conditions which produce nonhomogeneous flow of the fluid at low apparent viscosity, and preferably at a minimal apparent viscosity. Also included is a method of determining the fluid conditions at which the fluid flows nonhomogeneously at a low or minimal apparent viscosity. The method may further comprise crosslinking the fluid while inputting shear energy to the fluid and determining the ranges of shear energy input to the fluid which produce nonhomogeneous flow of the fluid at a low apparent viscosity. The fluid may then be flowed at flow rates which create fluid shear energies within the ranges which produce nonhomogeneous flow at a low or minimal apparent viscosity in a conduit or well fracture. When used with a delayed cross-linked fracturing gel, the method further comprises determining the temperature in the preselected zone of conduit or in the well fracture and selecting a delayed cross-linkable fluid having nonhomogeneous flow properties which is crosslinked at or below the temperature in the preselected zone of conduit or in the well fracture but above ambient temperature.

23 Claims, 13 Drawing Sheets

SCALE-UP: 2-LAYER TUBULAR FLOW

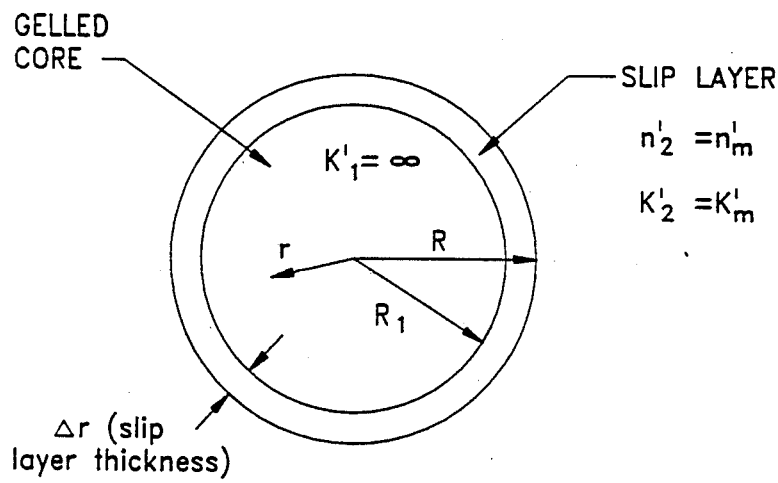

$$\eta_{APP} = K'_{APP} \, (\dot{\gamma}_{APP})^{n'_m - 1}$$

Where: 
$$K'_{APP} = \frac{K'_m}{\left[1 - \left(\frac{R-\Delta r}{R}\right)^{3+1/n'_m}\right]^{n'_m}} \quad \text{①}$$

At the <u>Same</u> $\dot{\gamma}_{APP}$ $$\frac{\eta_{APP_{0.303"}}}{\eta_{APP_{0.57"}}} = \left[\frac{1 - \left(\frac{R-\Delta r}{R}\right)^{3+1/n'_m}_{0.57"}}{1 - \left(\frac{R-\Delta r}{R}\right)^{3+1/n'_m}_{0.303"}}\right]^{n'_m}$$

< 1, If $\Delta r$ the Same in Each Tube

[Independent of $K'_m$]

FIG. 9

METHOD OF FLOWING A HIGH VISCOSITY SUBSTANCE THROUGH A CONDUIT AT A LOW APPARENT VISCOSITY

BACKGROUND OF THE INVENTION

1. Field of the Invention

This invention relates to a method of flowing a high viscosity substance through a conduit at a low apparent viscosity and more particularly, but not by way of limitation, to a method of flowing a high viscosity hydraulic-fracturing gel in a well fracture at a low apparent viscosity and a high proppant carrying ability.

2. Setting of the Invention

Hydraulic fracturing has made a significant contribution to the petroleum industry as a method for enhancing oil and gas producing rates and recoverable reserves. Fracturing was introduced to the industry in 1949. Since then, it has evolved into a standard operating practice. About 35 to 40 percent of all currently drilled wells are hydraulically fractured, and about 25 to 30 percent of total U.S. oil reserves have been made economically producible by the process. It has increased North America's oil reserves by an additional eight billion barrels.

Over the years, the technology associated with fracturing has increased significantly. A host of fracturing fluids have been developed for reservoirs ranging from shallow, low temperature formations to those that are deep and hot. Many different types of proppants have been developed. These range from silica sand to high strength materials for use in deep formations where fracture closure stresses exceed the ranges of sand capabilities.

A fracturing fluid is used basically to: (1) wedge open and extend a fracture hydraulically, and (2) transport and distribute the proppant along the fracture. The fluid selected for a treatment can have a significant influence on the resulting effectively propped fracture length and fracture conductivity, as well as on 5 treatment costs. Fluid properties strongly govern fracture-propagation behavior and the distribution and placement of the propping agents. The effective viscosity of the fluid controls the internal fracturing pressure and the proppant transporting characteristics.

Cross-linkable fluids are commonly used in fracturing today because of the purportedly better proppant carrying and temperature stability performance. The term "cross-linkable fluids" is used herein to describe fluids which may be crosslinked to form a gel. This cross-linked fluid, or gel, is also referred to as a gel-solid since it may exhibit the infinite viscosity characteristics of a solid, depending upon flowing conditions and shear history. A "delayed" cross-linkable fluid (or delayed crosslinked gel) is one that does not begin crosslinking until reaching a threshold temperature. These cross-linkable fluids have very complex rheological properties and for the most part are guar or hydroxypropyl guar (HPG) solutions crosslinked with some type of metallic compound, e.g., a borate or titanate compound. The cross-linked gel behavior is affected by a number of things, including temperature, temperature history, shear rate and history, time degradation, and chemical contamination. At this time, techniques for characterizing the rheological behavior of cross-linked fluids are not well established. Cross-linked fluids or gels are known to have a very high viscosity and good proppant carrying ability, but their flow curves are not always linear and can demonstrate significant dependence on temperature and shear rate.

Shortcomings of cross-linked fluids include their flow predictability, i.e., the design of fracturing treatments is impeded by the uncertainty in predicting the flow behavior of cross-linked fracturing fluids and it is unknown whether they flow as partially cross-linked solutions, degraded (fractured) gels with similarities to emulsions, or as gels flowing on a fluid layer at the wall. Another shortcoming is the uncertainty in scaling experimental data obtained in lab equipment, such as a Fann viscometer, to field conditions in a well fracture. Another shortcoming is poor experimental repeatability and the large variation in published rheology data which can exist between nominally similar cross-linked fluids provided by different service companies.

Therefore, there is a need for a high viscosity substance with a high proppant carrying ability with predictable and repeatable viscosity and flow characteristics, as well as a method for producing such a substance or fluid. It is contemplated that such an improved fluid and method would produce greater rates of production from wells. It is also contemplated that such a method of flowing a high viscosity substance through a conduit at a low apparent viscosity will provide a means of fracturing a well and carrying proppant at a relatively low pressure, thereby enabling the hydraulic fracturing of wells having low closure stresses which are not fracturable according to conventional practice.

SUMMARY OF THE INVENTION

The present invention is contemplated to overcome the foregoing deficiencies and meet the above-described needs. For accomplishing this, the present invention provides a novel and improved method of flowing a high viscosity substance, such as a fracturing fluid, through a conduit at a low apparent viscosity.

The method of flowing a high viscosity substance through a conduit at a low apparent viscosity comprises the steps of: selecting a cross-linkable fluid having nonhomogeneous flow properties; and flowing the fluid through the conduit at fluid conditions which produce nonhomogeneous flow of the fluid at a low, and preferably minimal, apparent viscosity. By "apparent" viscosity is meant the viscosity observed by a laboratory observer using conventional homogeneous viscometry testing and data reduction. The invention further comprises determining the fluid conditions at which the fluid flows nonhomogeneously at a low or minimal apparent viscosity. The method may also include the steps of cross-linking the fluid while inputting shear energy, such as subjecting the fluid to various selected shear rates, and determining the ranges of shear energy input to the fluid which produce nonhomogeneous flow at a low apparent viscosity. The fluid may then be flowed at rates which create fluid shear energies within such ranges.

In a preferred embodiment, the invention provides a method of flowing a high viscosity substance, such as a high viscosity fracturing fluid or gel, in a preselected zone of a conduit or a well fracture at a low apparent viscosity and comprises the steps of: determining the temperature in the preselected zone of conduit or the well fracture; selecting a delayed cross-linkable fluid having nonhomogeneous flow properties which is crosslinked at the temperature in the preselected zone of conduit or the well fracture; determining the fluid conditions at which the fluid flows nonhomogeneously at a low apparent viscosity in the preselected zone of conduit or in the well fracture; and flowing the fluid through the zone of conduit or the well fracture at the fluid conditions which produce nonhomogeneous flow of the fluid at a low or minimal apparent viscosity.

BRIEF DESCRIPTION OF THE DRAWINGS

The present invention will be better understood by reference to the examples of the following drawings:

FIG. 9 illustrates the theoretical relationship for the ratio of viscosities in tubes of two different diameters for the case of two-layer nonhomogeneous flow with a solid core flowing on a wall-fluid "slip" layer.

DETAILED DESCRIPTION OF THE PREFERRED EMBODIMENTS

Figure 1:
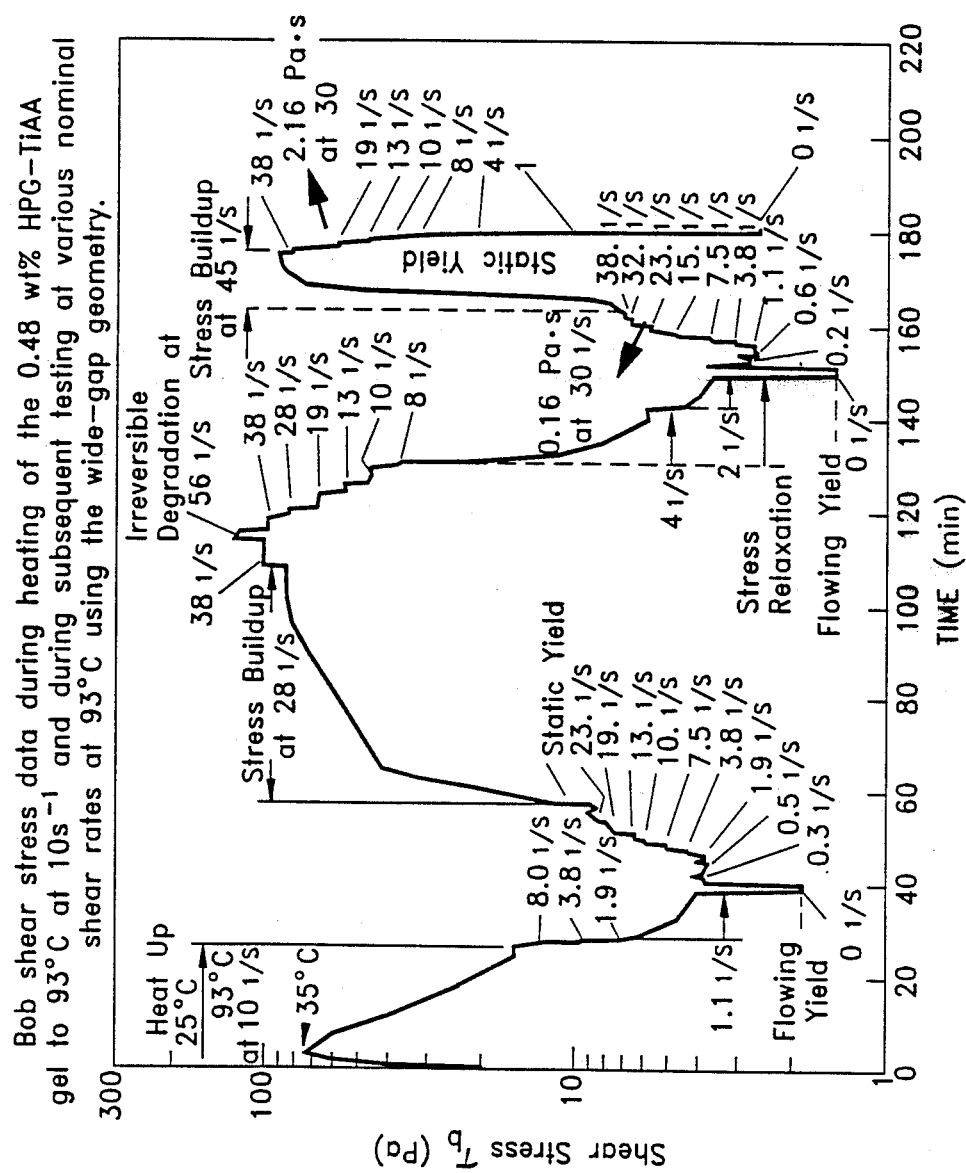
FIG. 1 is a plot of bob shear stress (at the bob wall) versus time during heating of a titanium crosslinked fluid and during subsequent testing at various nominal shear rates illustrating the phase (stress) transformation phenomenon.

The present invention may be generally described as a method of flowing a high viscosity substance through a conduit at a low apparent viscosity, which comprises the steps of: selecting a cross-linkable fluid having nonhomogeneous flow properties, and flowing the fluid through the conduit at fluid conditions which produce nonhomogeneous flow of the fluid at a low apparent viscosity. Preferably, the flowing step comprises flowing the fluid through the conduit at the fluid conditions which produce nonhomogeneous flow at a minimal apparent viscosity. More preferably, the flowing step comprises flowing the fluid through the conduit at the fluid conditions which produce apparent slip flow at a minimal apparent viscosity. The invention can be practiced by flowing a cross-linkable fluid through a conduit at the fluid conditions, e.g., temperature, shear rate, shear stress, necessary to crosslink the fluid and produce nonhomogeneous flow at a low apparent viscosity.

It is contemplated that many complex fluids such as suspensions, emulsions, foams, and gels which are known to exhibit apparent slip flow properties, and particularly those which may be crosslinked, i.e., cross-linkable fluids, may be used to practice the present invention. Since it has not been previously known that cross-linkable fluids will reliably and repeatably flow at low apparent viscosities with good proppant transport capability, one embodiment of the invention comprises determining the fluid conditions at which the fluid flows nonhomogeneously as a gelled solid over low viscosity slip layers at a low apparent viscosity. The fluid conditions ma be determined by crosslinking the fluid while inputting shear energy to the fluid and determining the ranges of shear energy input to the fluid which produce nonhomogeneous flow of the fluid at a low apparent viscosity and preferably at minimal apparent viscosities. Once the ranges of shear energy are determined, the method of the invention may be further practiced by flowing the fluid at flow rates which create fluid shear energies within the ranges determined in the previously discussed steps.

In a preferred embodiment, the fluid conditions which produce nonhomogeneous flow at low or minimal viscosities are determined by crosslinking the fluid at various selected cross-link shear rates, measuring the shear stress and apparent viscosity of the cross-linked fluid at various selected shear rates, and determining the crosslink shear rates which produce nonhomogeneous flow of the cross-linked fluid at minimal apparent viscosities, i.e., at each selected cross-link shear rate the shear stress and apparent viscosity of the cross-linked fluid are measured at various selected shear rates and the results plotted or graphed in order to determine the cross-link shear rates which produce nonhomogeneous flow at minimal apparent viscosities. Once this has been determined, the fluid may be crosslinked at a shear rate which produces nonhomogeneous flow of the cross-linked fluid at a low or a minimal apparent viscosity while flowing through the conduit. This may be accomplished by calculating the flow rates or pumping rates of the fluid which produce the desired shear rates and shear stresses in the fluid and flowing the cross-linked fluid at such flow rates.

The invention also provides a method of flowing a high viscosity substance in a preselected zone of a conduit at a low apparent viscosity and a method of non-homogeneously flowing a high viscosity fracturing gel in a well fracture at a low apparent viscosity and a high proppant carrying ability. This method comprises the steps of determining the temperature in the preselected zone of conduit or in the well fracture; selecting a delayed cross-linkable fluid having nonhomogeneous flow properties which is crosslinked at the temperature in the preselected zone of conduit or in the well fracture; determining the fluid conditions at which the fluid flows nonhomogeneously at a low apparent viscosity in the preselected zone of conduit or in the well fracture; and flowing the fluid through the zone of conduit or the well fracture at the fluid conditions which produce nonhomogeneous flow of the fluid at a low apparent viscosity. The temperature in the preselected zone of conduit or in the well fracture may be determined by measuring the temperature, as is well known. The temperature in the preselected zone of conduit also may be determined by controlling the temperature with the use of heat or refrigeration sources, as is also well known, preferably, the fluid is flowed through the zone of conduit or fracture at fluid conditions which produce nonhomogeneous flow of the fluid at a minimal apparent viscosity, and more preferably at fluid conditions which produce nonhomogeneous flow at apparent slip flow and a minimal apparent viscosity.

Similarly to the previously discussed embodiment, the fluid conditions at which the fluid flows nonhomogeneously at a low apparent viscosity in the zone of conduit or fracture may be determined by crosslinking the fluid while inputting shear energy to the fluid; i.e., since the fluid is a delayed cross-linkable fluid, it must be heated to an elevated temperature to crosslink and shear energy should be inputted to the fluid while crosslinking by flowing, pumping, or otherwise subjecting the fluid to shear rate and shear stress (shear energy=shear rate×shear stress); and determining the ranges of shear energy input to the fluid which produce nonhomogeneous flow of the fluid at a low apparent viscosity, and preferably at a minimal apparent viscosity.

Once the ranges of shear energy which produce nonhomogeneous flow at low apparent viscosities are determined, the fluid may be flowed in the zone of conduit or fracture at flow rates which create shear energies within the ranges determined in order to produce nonhomogeneous flow at a low or minimal apparent viscosity in the preselected zone of conduit or well fracture.

In a more preferred method of determining whether the cross-linkable fluid will nonhomogeneously flow at low apparent viscosities, the fluid is crosslinked at various selected cross-link shear rates (as may be accomplished in a concentric cylinder viscometer and explained in Examples 1 and 2, below); nonhomogeneous flow is tested for using suitable flow visualization methods (e.g., as may be determined in a concentric cylinder viscometer and as described below); the shear stress and apparent viscosity of the cross-linked fluid at various selected shear rates are measured, i.e., for each crosslink shear rate at which the fluid is crosslinked, the fluid should be subjected to various selected shear rates and the shear stress and apparent viscosity measured at each of the various selected shear rates (also possible in a viscometer); and the observed data are compared to determine whether any of the cross-link shear rates produce nonhomogeneous flow at low and minimal apparent viscosities.

It is contemplated that there are some types of delayed cross-linkable fracturing fluids in which the heating rate at which the fluid is crosslinked will affect the cross-linked fluids ability to flow nonhomogeneously at low apparent viscosities. With such fluids, or if it is unknown whether the cross-linking heating rate affects the nonhomogeneous flow of the fluid, the method of determining whether the cross-linkable fluid will flow nonhomogeneously at low apparent viscosities should comprise the steps of: crosslinking the fluid (with and without a suitable proppant) at various selected cross-link heating rates, such as with a concentric cylinder viscometer and explained in Examples 1 and 2 below; crosslinking the fluid at various selected cross-link shear rates at each of the selected cross-link heating rates; testing for nonhomogeneous flow using a suitable flow visualization technique (e.g., that described below); measuring the shear stress and apparent viscosity of the cross-linked fluid at various selected shear rates; and determining whether there are combinations of cross-link heating rate and cross-link shear rate which produce nonhomogeneous flow at low or minimal apparent viscosities.

Once the ranges of shear energies, cross-link heating rates, cross-link shear rates, and/or flowing shear rates which produce nonhomogeneous flow at low or minimal apparent viscosities are determined, the fluid may be flowed in the preselected zone of conduit or in the well fracture at such fluid conditions. This will result in crosslinking the fluid at a shear rate or a combination of heating rate and shear rate which produces nonhomogeneous flow in the preselected zone of conduit or in the well fracture at a low or minimal apparent viscosity.

When the method of the present invention is used with a fracturing fluid in a well fracture, proppant may be added to the fluid before crosslinking and the fluid and proppant may then be nonhomogeneously flowed into the fracture at the fluid conditions which produce nonhomogeneous flow of the fluid at a low or minimal apparent viscosity, as further discussed below in Examples 1 and 2. Similarly, the invention may be used to transport particulate matter, slurry, etc., suspended in the cross-linked gel through a conduit at a low or minimal apparent viscosity, thereby greatly reducing the energy required to pump such particulate matter.

To facilitate a better understanding of the present invention, the invention and its development will now be described in greater detail. The inventor initially found that when cross-linkable fracturing fluids are crosslinked at low or moderated shear rates, e.g., less than 170 reciprocal seconds (1/s) in concentric cylinder viscometers, the fluids acquire a phase transformation property (also referred to as stress transformation or stress transformation phenomenon). This property is the ability to nonhomogeneously flow either as a cross-linked gel-solid in apparent slip flow at a low apparent viscosity or as a viscous liquid at a greater apparent viscosity. The low apparent viscosity (and low shear stress) flow condition will also be referred to herein as the "low stress state" of the fluid and the higher apparent viscosity (high shear stress) flow condition will also be referred to as the "high stress state" of the fluid. It is contemplated that, in the low stress state, the cross-linked gel flows in apparent slip flow, with the central portion and bulk of the cross-linked fluid flowing as a gel-solid (or gelled core) surrounded by thin fluid regions (or slip layers) between the gel-solid and the surrounding walls, as illustrated in FIG. 9. The gel-solid portion flows as a cross-linked solid with infinite viscosity but the apparent viscosity and consequently the flowing friction pressure and shear stress are low, believed to be because the gel-solid portion is transported between thin layers of low viscosity fluid at the walls.

The phase transformation from the low stress state to the high stress state occurs when the viscometer angular velocity (shear stress in the fluid) attains a critical level. It is believed that a certain shear stress level is required to break down the gel-solid portion. When this critical shear stress level is achieved, the apparent viscosity slowly increases. It is contemplated that this slow increase in the apparent viscosity is due to the breakdown of the gel-solid portion and that the gel-solid portion is beginning to migrate into the fluid layers at the walls. As will be further explained below, in the low stress state proppant, such as sintered bauxite, is perfectly supported within the gel-solid, i.e., the particles do not settle. In the high stress state, even though the apparent viscosity of the fluid increases, the proppant transport capability of the gel-solid portion decreases, i.e., the proppant begins to settle, because the viscosity of the gel-solid portion is now finite and its yield stress is lowered. This phase J transformation between the low stress state and high stress state is nearly reversible. The fluid will transform back into the low stress state upon reducing the shear stress below another critical value, as explained below.

FIG. 1 shows the shear stress ($\tau_b$) history during crosslinking (heat up) and subsequent shear rate testing. FIG. 1 demonstrates the phase transformation of a 0.48 weight percent hydroxypropyl guar (HPG) solution crosslinked with titanium acetylacetonate. Referring to FIG. 1 between 160 and 190 minutes of time, it is seen that the fluid shows a dramatic difference in the "low" apparent viscosity at 30 1/s shear rate in the low stress state (0.16 pascal seconds (Pa.s)) versus that in the high stress state (2.16 Pa.s) at a shear rate of 30 1/s.

Figure 2:
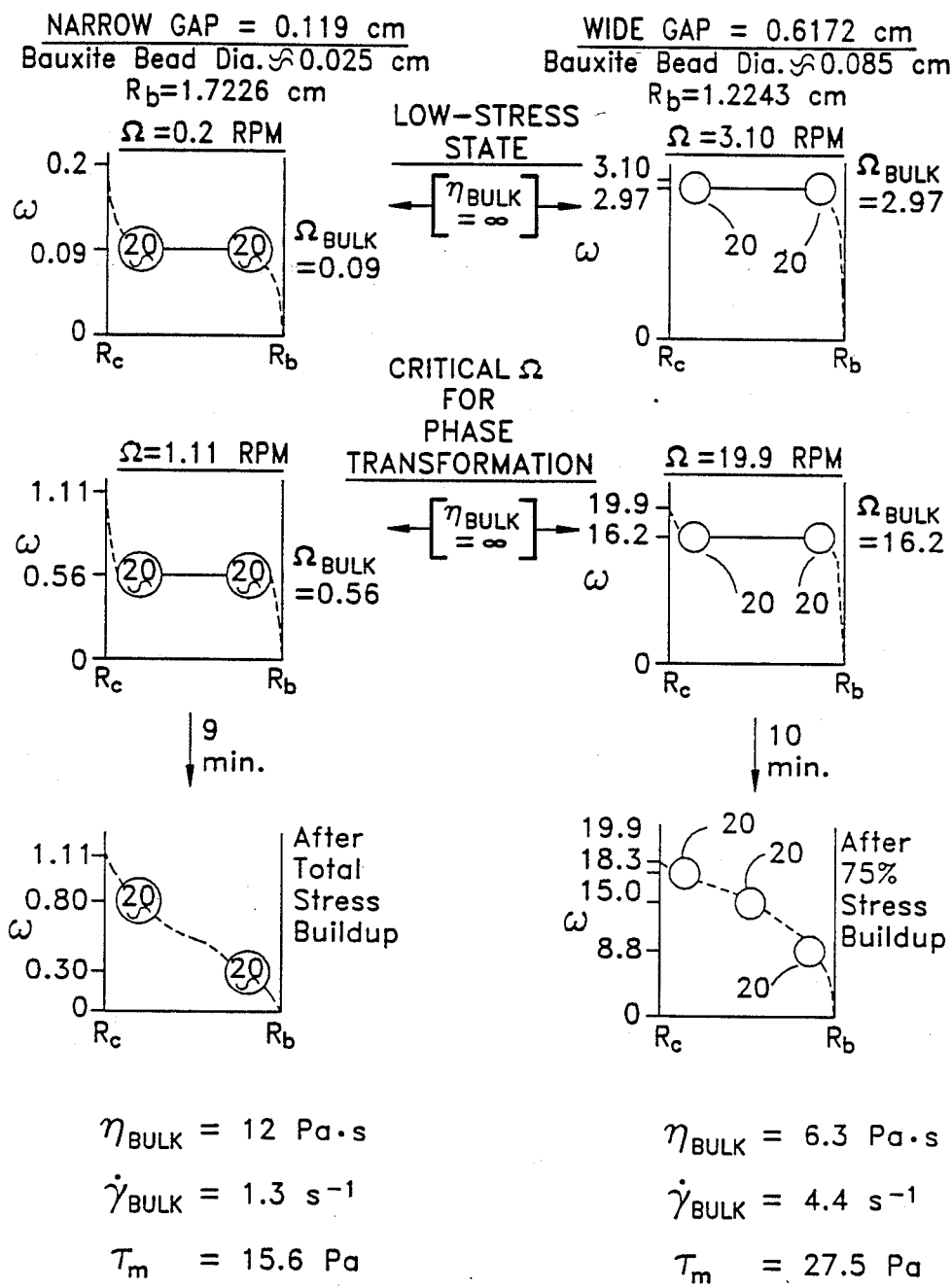
FIG. 2 illustrates the flow visualization of the phase transformation of a titanium cross-linked gel in a Couette viscometer with a transparent cup.

FIG. 2 illustrates a flow visualization experiment using the same fluid where the low stress state was found to provide apparent slip flow resulting in perfect proppant transport. FIG. 2 represents a concentric cylinder viscometer where $R_b$ represents the radius of the bob or inner cylinder of the viscometer at the wall and $R_c$ represents the radius of the cup at the inside wall of the cup. The area extending horizontally between $R_b$ and $R_c$ is the gap in the cylindrical viscometer in which the fluid is held. $\Omega$ represents the cup angular velocity, $\omega$ represents the fluid angular velocity, and $\Omega_{BULK}$ is the bulk material (gel-solid portion) angular velocity in the low stress state. As illustrated, in the low stress state, the velocities of the bauxite proppant particles or beads are constant across the gap, which indicates a crosslinked gel-solid with infinite viscosity. In the high stress state, $\gamma_{BULK}$ represents shear rate and $\gamma_m$ represents shear stress evaluated at the gap center. $\eta_{BULK}$ is the viscosity of the gel-solid core portion in the gap center. As illustrated in FIG. 2, in the high stress state, the beads or particles 20 move at different angular velocities indicating different fluid angular velocities across the gap and therefore that the gel-solid portion is no longer solid and is beginning to behave more like a homogeneous fluid. Also, the larger proppant particles 20 in the wide gap geometry settled out after approximately 75 percent of the stress buildup had been attained, indicating a finite viscosity and fluid behavior more like a homogeneous fluid. FIGS. 1 and 2 are further explained in Example 1, below.

Figure 3:
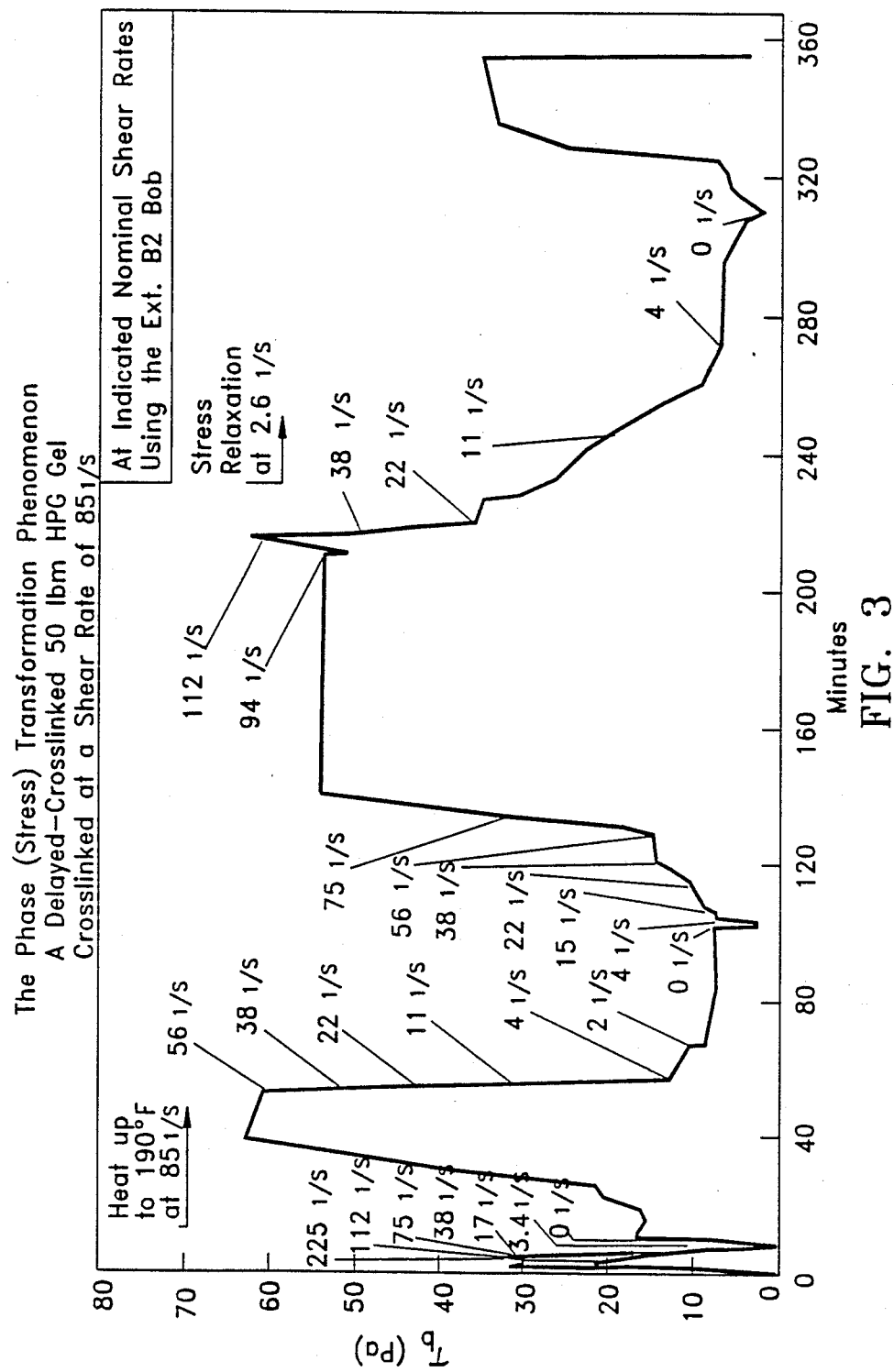
FIG. 3 is a plot of bob shear stress at various nominal shear rates versus time illustrating the phase transformation of a delayed cross-linked gel crosslinked at a shear rate of 85 reciprocal seconds (1/s)
Figure 4:
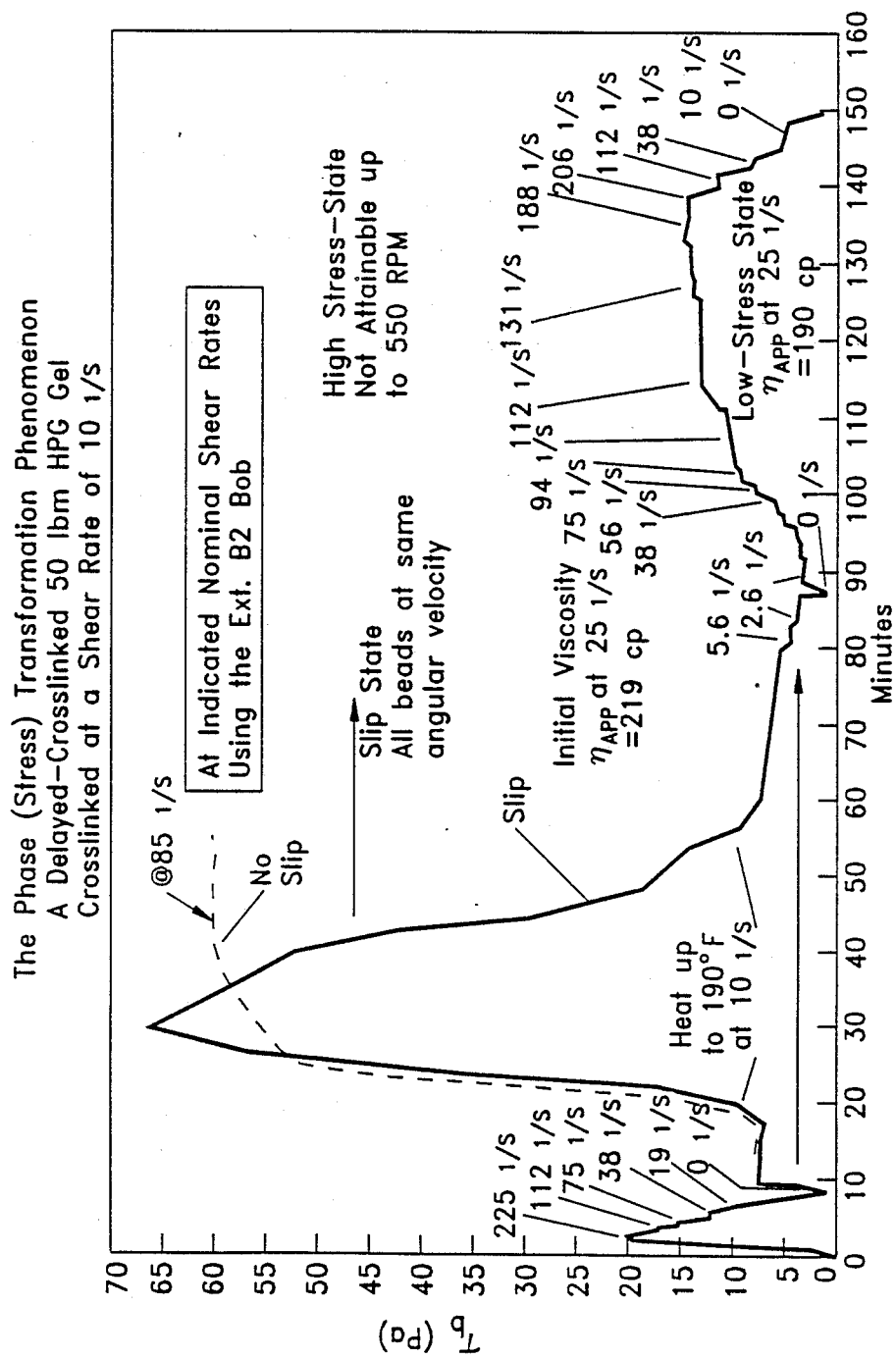
FIG. 4 is a plot of bob shear stress at various nominal shear rates versus time for a delayed crosslinked gel crosslinked at 10 1/s.
Figure 5:
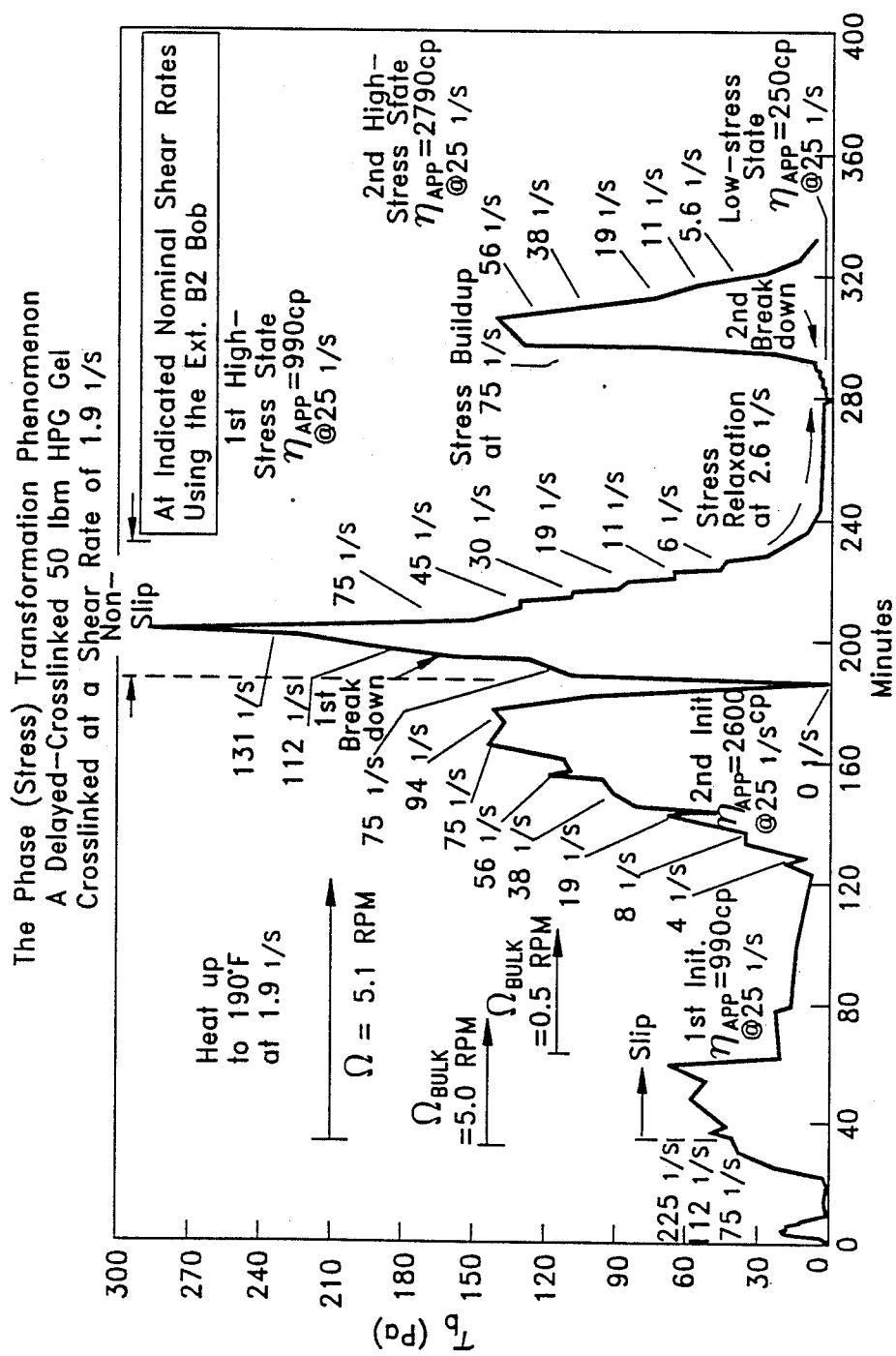
FIG. 5 is a plot of bob shear stress at various nominal shear rates versus time illustrating the phase transformation of a delayed cross-linked gel crosslinked at 1.9 1/s.

More recent work indicates that the energy input rate during crosslinking determines whether the crosslinked fluid is initially in the low stress state or the high stress state. For example, it has been shown that energy rates above 5100 joules per meter$^3$.seconds (J/M$^3$.s) produce the high stress state immediately after crosslinking, while lower energies, e.g., 600 J/M$^3$.s, produce a low stress state initially after crosslinking. FIGS. 3-5 illustrate the effects on the shear history and the phase transformation property of crosslinking a 50 lbm HPG delayed cross-link gel (50 pounds of HPG per 1,000 gallons of water) at various selected nominal shear rates. While heating to 190° Fahrenheit, a maximum shear stress of approximately 60 pascals (Pa) developed for all three tests, i.e., FIG. 3, FIG. 4, and FIG. 5. FIG. 3 illustrates the fluid crosslinked at a nominal shear rate of 85 1/s. In FIG. 3, the resulting cross-linked gel was in the high stress state once the gel had crosslinked and reached 190° Fahrenheit, as illustrated by the stress peak at approximately 40 minutes. This was confirmed by flow visualization tests which showed all the fluid flowing in a conventional sense, i.e., exhibiting behavior more like single-phase liquid flow. Referring to FIG. 3, at approximately 55 minutes, it can be seen that the fluid relaxes only after the shear rate is dropped to approximately 38 1/s. Referring to FIG. 4, the dotted line which is labeled "no slip at 85 1/s" illustrates the behavior of the fluid crosslinked at 85 1/s if the shear rate of 85 1/s is maintained, i.e., the fluid remains in the high stress state.

However, when the fluid is crosslinked at 10 1/s (FIG. 4) and 1.9 1/s (FIG. 5), the fluid was in the low stress state after reaching cross-linking temperature of 190° Fahrenheit, i.e., at approximately 40 minutes in FIG. 4 and 40 minutes in FIG. 5. It is contemplated that the phase state (low stress state or high stress state) which the fluid exhibits following crosslinking depends on the shear energy (shear stress times the shear rate) imparted to the fluid during crosslinking. It is believed that the energy at lower shear rates is not sufficient to prevent the gelation of the gel-solid core portion and apparent slip flow in the low stress state is the result.

FIG. 4 illustrates that the gel-solid central portion is in the apparent slip flow state at a low apparent viscosity immediately following crosslinking at 10 1/s. The highest shear stress attainable at 190° Fahrenheit was approximately 15 Pa. Only after cooling the crosslinked fluid to room temperature did it break down and then at a shear stress of 31 Pa (not illustrated). It is believed that this increased shear stress was attainable because of increased viscosity in the slip layer due to the cooler temperature. In contrast, FIG. 5 illustrates that when crosslinked at 1.9 1/s the gel-solid portion is in apparent slip flow immediately following crosslinking, but the observed initial viscosities are initially much higher than typically observed in the low stress state, e.g., 219 centipoise (cp) in FIG. 4 vs. 990 centipoise in FIG. 5. (It should be noted that the viscosities are calculated from a series of data points taken at various angular velocities of the viscometer cup. Also, the nominal shear rate is calculated from the angular velocity of the viscometer cup using a factor dependent only upon the geometry of the viscometer, the factor being 0.375 for this bob and cup geometry.) The shear stress required to breakdown the gel-solid in FIG. 5 was approximately 160 Pa. It is contemplated that when the gel-solid portion is crosslinked at very low energy levels, a very "tight" gel structure results and the fluid layers between the gel-solid portion and the walls are small, giving a relatively high shear stress and apparent viscosity. However, once the gel-solid portion is broken down, the gel-solid portion can be reformed by reduction of shear stress to give a weaker gel with the typical low apparent viscosities observed in the low stress states of fluids crosslinked at higher shear rates. This can be seen in FIG. 5 at the second occurrence of the low stress state at approximately 285 minutes, i.e., a "low" apparent viscosity of 250 cp at 25 1/s (compared to 2790 cp in the high stress state at approximately 315 minutes). Thus, FIGS. 3-5 illustrate that there is an optimum range of shear energy inputs which give apparent slip flow at minimal viscosity, i.e., it is an elevated range and shear energy inputs below and above the range result in higher apparent viscosities initially following crosslinking.

Figure 6:
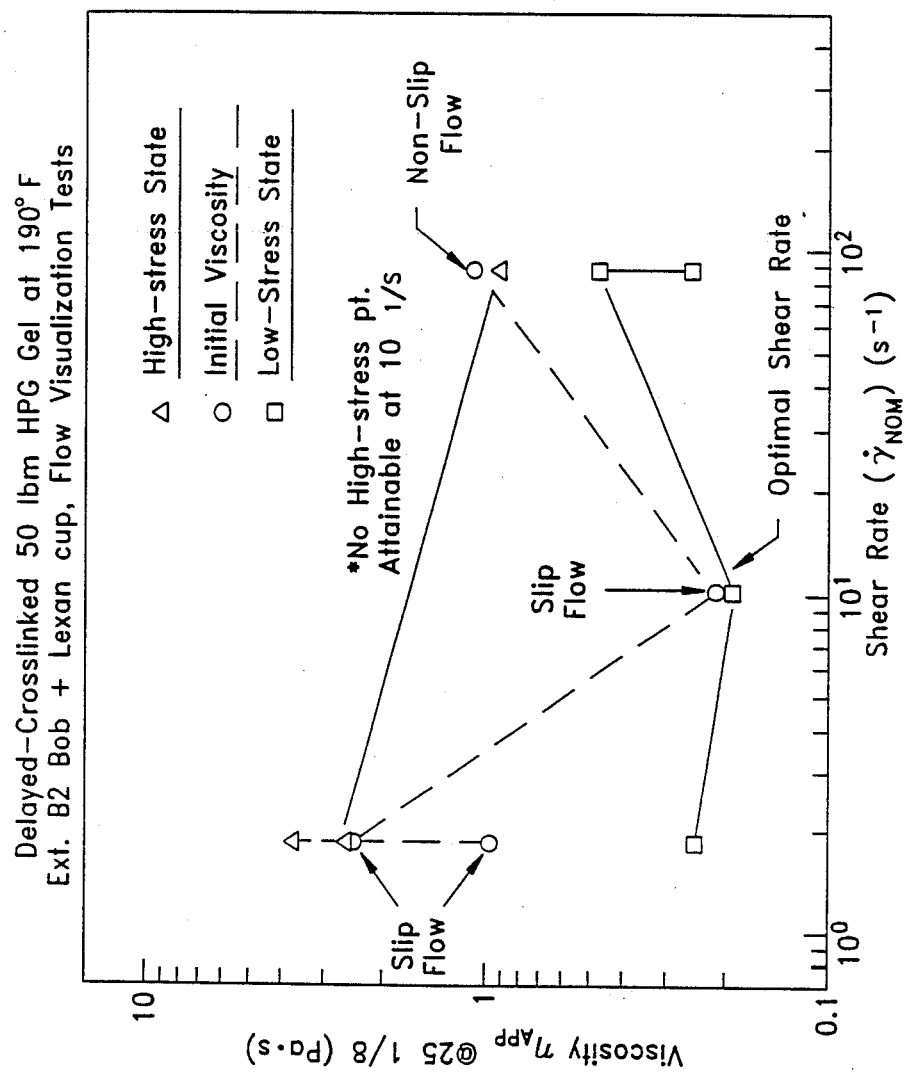
FIG. 6 is a plot of calculated viscosities versus cross-link shear rate in a series of tests conducted on a delayed cross-linked gel to determine the optimum cross-link shear rate giving the lowest initial viscosity.

Therefore, as illustrated in FIGS. 3–5, the present invention also provides a method for designing hydraulic well fracturing treatments which utilize the phase transformation property of a delayed cross-linked fracturing fluid. In a preferred embodiment, the method comprises two steps, each having multiple substeps. The first step entails the determination of the optimum energy input rate for the delayed cross-linkable fluid during crosslinking (that which gives apparent slip flow at a minimal viscosity) as well as measurement of the viscosity data. The second step is a fracture simulation step where flow rates in the fracture are computed based on the optimum energy input rate determined in the first step. This embodiment can be summarized by the following steps and 1. Tests on the delayed cross-linkable fluid:
   a. Perform laboratory tests utilizing a concentric cylinder viscometer, preferably a Couette type viscometer, to determine whether the gel exhibits a low stress state and a high stress state. For example, flow visualization studies as previously discussed may be used. These tests are further explained in Examples 1 and 2 which are found towards the end of this document.
   b. If the fluid exhibits the phase transformation property, crosslink the fluid in the concentric cylinder viscometer while heating it to reservoir temperature (this step requires that the delayed cross-linkable fluid be selected to have a crosslink temperature below that of the well reservoir) over short, e.g., 10 minute, and long, e.g., 100 minute, time periods at various nominal shear rates ranging from 2 1/s to 300 1/s, e.g., four tests at both the short and long time periods. Record the maximum shear stress attained during crosslinking. This substep determines whether the cross-link heating rate affects the low stress state and also approximates the conditions in the well reservoir, i.e., when the fluid initially begins to flow into the reservoir, the reservoir will be at a higher temperature and will heat the fluid more rapidly and as the fluid continues to flow into the reservoir the fluid cools the reservoir and therefore it takes a longer period of time for the reservoir to heat the fluid to its cross-link temperature.
   c. When the fluid reaches reservoir temperature, do an initial shear rate sweep to generate the initial viscosity data, i.e., sweep up or down to the shear rate just before shear stress buildup or shear stress relaxation is observed.
   d. If the fluid is in the high stress state, shear stress relaxation will be observed upon a sweep down in the shear rate. If this happens, the cross-link shear rate is too high because it did not produce the low stress state. Test at lower cross-link shear rates.
   e. During each test, determine the initial viscosities following crosslinking and viscosities at various time intervals spanning the anticipated fracturing treatment time.
   f. For each series of tests at each heating rate, plot the calculated viscosities versus cross-link shear rate and determine the optimum cross-link shear rate which is that giving the lowest initial viscosity with apparent slip flow. An example of such a plot is provided in FIG. 6.
   g. Calculate the optimum shear energy input rate (shear stress times shear rate) using the optimum cross-link shear rate and the maximum shear stress attained during crosslinking, i.e., during heat up to cross-link temperature.
   h. If a tubular flow device is available which can make rheological measurements, a preferred method would be to use this device in substeps 1.b–1.g instead of the concentric cylinder viscometer.
   i. Testing using the tubular flow device would have certain differences: (1) the range of cross-link shear rates would be larger (e.g., up to 2000 1/s); (2) the stress transformation phenomena may not be apparent, and (3) fluid samples should be taken from the flow device before shear sweeps and tested on a Couette viscometer (with gap widths comparable to the flow device tubing diameter) to ascertain the existence of the low stress (slip) state.

The measurement of viscosity and related information as well as the use of viscometers, including Couette-type viscometers, is known in the art and is discussed in an article entitled "Introduction to Practical Viscometry," pp 1–15, by the Haake Company, which is incorporated herein by reference thereto.

2. Fracture treatment design:
   a. Using a suitable hydraulic well fracturing simulator, input the rheology of the fracturing fluid when in the low stress state. Use the data from substep 1.f. which yielded the optimum cross-link shear rate for the series of tests using the short heat up time.
   b. Pick a desired fracture treatment fluid flow rate and calculate the fracture pressures, geometry, and wall shear rates for the reservoir and fracture formation.
   c. Calculate the maximum shear energy input in the fracture, i.e., wall shear rate times the maximum shear stress during crosslinking.
   d. Iterate steps 2.b and 2.c, adjusting the fluid flow rate until the calculated maximum shear energy input best matches the experimental value within practical design constraints. This will give the optimum pumping rate.
   e. Repeat steps 2.a. through 2.d., but this time use the data attained from the long heat up time experiments and calculated in step 1.f. The optimum pumping rates for the short heat up time will be used at the beginning of pumping the fracturing fluid and the optimum pump rate for the long heat up time will be used towards the end of pumping the fracturing fluid as the reservoir formation and fracture cool.

Hydraulic fracturing design and treatment; the use of fracturing fluids, including delayed cross-linked fracturing fluids; and the use of proppant are known in the art and are further described in two articles: "Overview of Current Hydraulic Fracturing Design and Treatment Technology—Part 1," by R. W. Veatch, Jr., Journal of Petroleum Technology (April 1983) 677–687; and "Overview of Current Hydraulic Fracturing Design and Treatment Technology—Part 2," by R. W. Veatch, Jr., Journal of Petroleum Technology (May 1983) 853–864; both of which are incorporated herein by reference thereto.

The practice of the invention will be better understood from a consideration of the following three examples which are provided by way of illustration and explanation and are not intended to be limiting.

EXAMPLE 1

Example 1 is a research paper prepared by the inventor which shows that when standard homogeneous fluid viscometry relations are applied to fluids which form rheologically distinct regions during flow (i.e., nonhomogeneous flows), the measured viscosities are actually some function of the rheology and geometry of each of these regions. In the paper, formulations for these apparent viscosities are developed for nonhomogeneous Couette (cylindrical viscometer) flows, and the analogous formulations for Poiseuille (tubular flow) and slot flows, are presented. Explicit formulations are given for fluid regions having power-law rheology, and predicted trends with assumed region rheology and geometry are shown. Testing of a hydroxypropyl guar (HPG) solution crosslinked with titanium acetylacetonate showed this gel to flow as a nonhomogeneous fluid in Couette flow. This conclusion is based on flow visualization studies and on the differences in the apparent experimental viscosity measured when using wide and narrow gap Couette viscometers. For this gel, a dramatic reversible change in rheology occurs when the angular velocity is increased to some critical level. At this critical angular velocity, the flow changes from a low shear stress apparent slip flow (low stress state) to a high shear stress nonhomogeneous flow (high stress state). Apparent slip flow data was modeled using a three-layer nonhomogeneous model.

The fracturing fluid or gel used in this study was a 0.48 weight percent hydroxypropyl guar (HPG) solution crosslinked with 0.04 volume percent titanium acetylacetonate (TiAA). This gel is similar to the so-called API generic gel which has been used by the API (American Petroleum Institute) in attempts to standardize viscosity test procedures for cross-linked fracturing fluids.

This research paper was written by J. R. Cameron and entitled "Viscometry of Nonhomogeneous Flows and the Behavior of a Titanium-Crosslinked Hydroxypropyl Guar Gel in Couette Flow" and published in the Journal of Rheology (1989), Volume 33, No. 1, 15-46, and the entire paper is incorporated herein by reference thereto. The entire paper is incorporated by reference as Appendix A.

EXAMPLE 2

Example 2 is a research article co-authored by the inventor (J. R. Cameron), D. C. Gardner, and R. W. Veatch subsequently to Example 1. The title of this second article is "New Insights on the Rheological Behavior of Delayed Crosslinked Fracturing Fluids," paper SPE 18209, pages 291-306 presented at the 1988 SPE Annual Technical Conference and Exhibition, Houston, Tex., Oct. 5-8, and the entire paper is incorporated herein by reference thereto. The entire paper is incorporated by reference as Exhibit B.

The research findings discussed in this paper suggest that the publically-available rheology data for delayed cross-linked fracturing fluids may diverge significantly from actual fluid behavior when flowing in a fracture. The rheology of delayed cross-linked fracturing fluids depends not only on the shear and thermal histories, but also on flow geometry, stress level, and time. These gels flow as nonhomogeneous fluids and also have a previously unreported stress-state (phase) transformation property. This phenomena is presently not accounted for in gel testing or data scale up, but can manifest itself in apparent test-geometry and time dependencies. The research also indicates that delayed cross-link fracturing fluids may give better proppant transport than expected.

Most of the viscosity testing in this example utilized a commonly used commercially-available delayed cross-linkable 50 lbm HPG/1,000 U.S gallon gel. The cross-linker was a proprietary, commercially-available, organometallic crosslinker.

EXAMPLE 3

Example 3 presents test data taken on a 50 lbm/1,000 gallon HPG commercially-available delayed cross-linked gel in a tubular flow loop and retested on a Fann Model 50C viscometer to show that the low stress state occurs in tubular flow and probably slot or fracture flow as well as in Couette flow in a viscometer.

Figure 7:
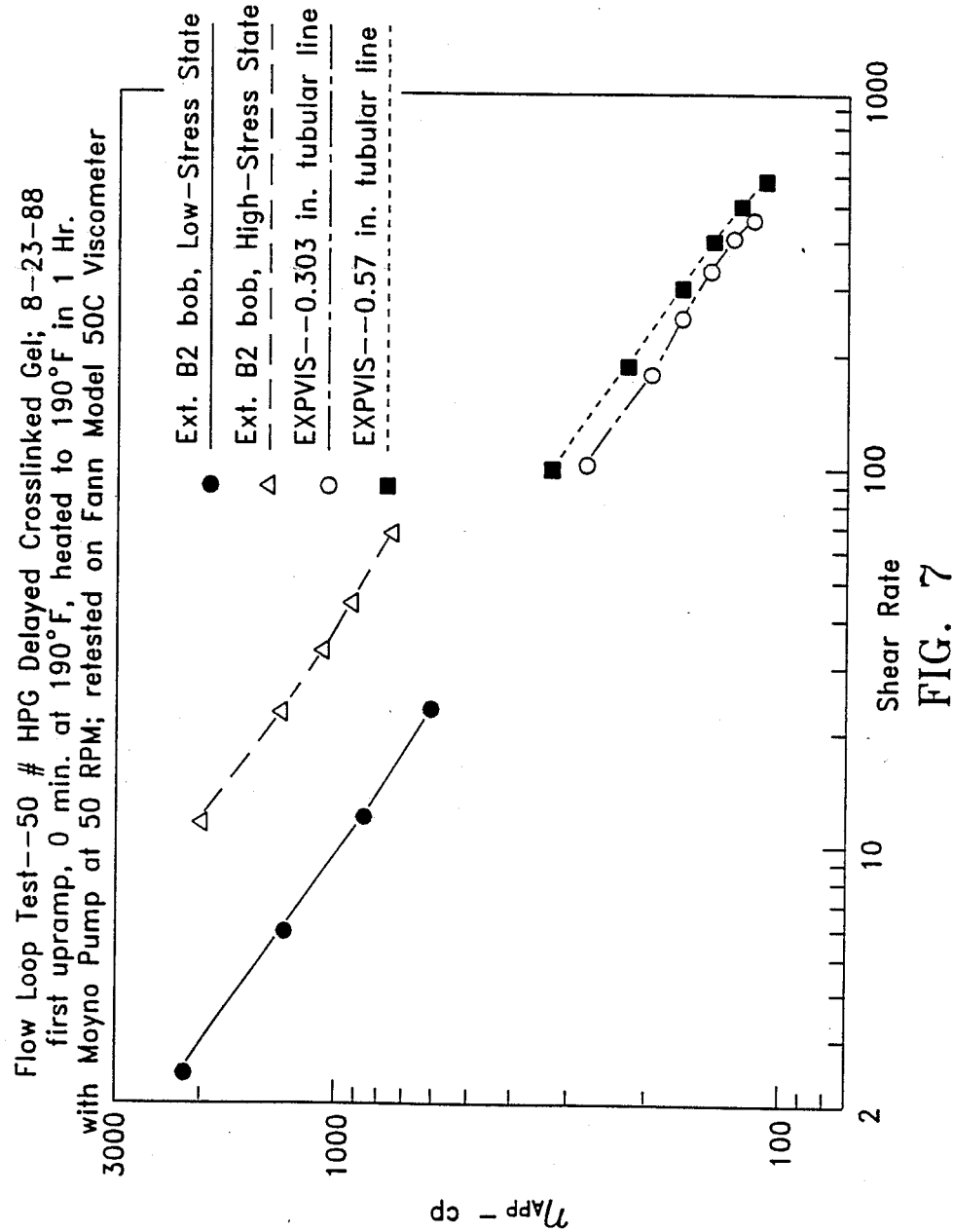
FIG. 7 is a plot of experimentally measured viscosities at 190° F. versus shear rate for a delayed cross-linked gel in a concentric cylinder viscometer and in a tubular flow loop.
Figure 8:
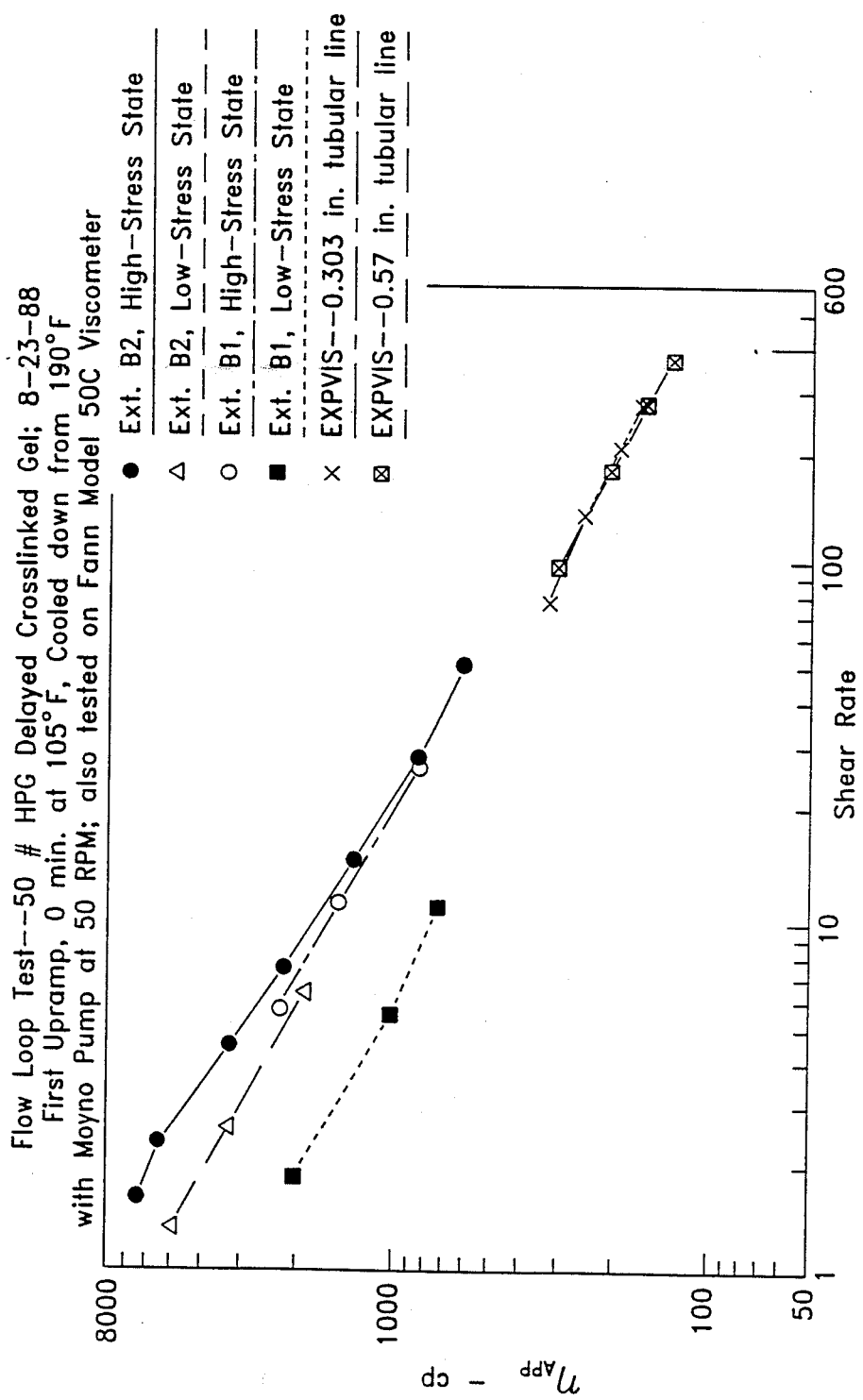
FIG. 8 is a plot of experimentally obtained viscosities at 105° F. versus shear rate for the delayed cross-linked gel of FIG. 7 tested in a concentric cylinder viscometer and in a tubular flow loop.

Evidence supporting the existence of apparent slip flow (nonhomogeneous flow with a liquid layer at the wall and a gel-solid core) is shown in FIGS. 7 and 8. In FIG. 7, a sample of gel was taken from the flow loop after being crosslinked at a nominal shear rate of 70 1/s during a one hour heating period to 190o Fahrenheit. This sample was then tested on the Fann viscometer at 190° Fahrenheit using the wide gap R1/B2 cup-bob geometry discussed in the previous examples. On the Fann viscometer, this fluid showed the phase transformation phenomenon giving both low stress state and high stress state viscosities. These are shown in FIG. 7. Immediately after the sample was taken from the flow loop, an upramp in shear rate was performed on the flow loop and the viscosities observed in the two different tube sizes of the flow loop are shown in FIG. 7. Note how extrapolation of the viscosities taken on the Fann viscometer (gap thickness of 0.243 inches) in the low stress state agree closely with those taken in the 0.303 inch diameter flow loop. This is not surprising if one assumes apparent slip flow was also occurring in the tubular flow loop with wall fluid slip layers of approximately the same thickness, e.g., 0.002 centimeters on the Fann viscometer R1/B2 cup and bob and 0.005 centimeters on the 0.303 inch tubing.

It is not possible to get low stress state data on the Fann viscometer at the high shear rates observed in the flow loop because the phase transformation occurs on the Fann viscometer before the high shear rates can be attained. This is a consequence of the stress profile in the Fann viscometer, i.e., there is a finite shear stress significantly greater than zero, on the fluid in a concentric cylinder viscometer at all points, which breaks down the gel-solid central portion at a critical stress level. In tubular flow, this gel-solid central portion may survive to higher apparent shear rates since the shear stress is lower in the gel-solid central portion, i.e., the shear 5 stress goes to zero at the exact center of tubular flow.

Similar behavior is seen in FIG. 8 for the same 50 lbm HPG delayed cross-linked gel tested at 105° Fahrenheit on the flow loop and on the Fann viscometer. Note that the best extrapolation of the Fann viscometer data to the flow loop data results when using the B2 bob low-stress state data.

In FIGS. 7 and 8, there is little difference between viscosities when measured on the 0.303 inch and 0.57 inch tubular flow loops. Nonhomogeneous theory predicts that this would be the case for apparent slip flow.

Figure 10:
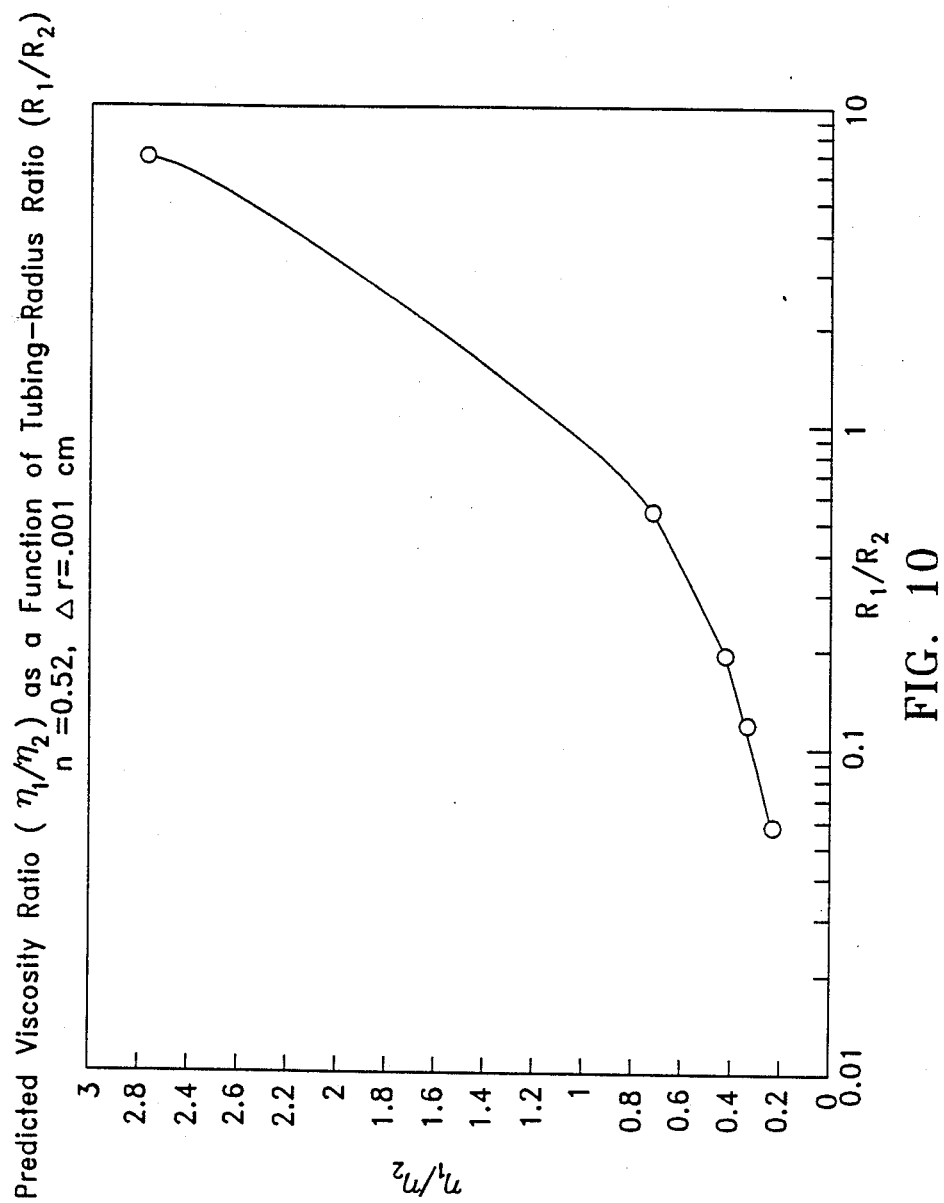
FIG. 10 is a plot of the predicted viscosity ratio versus tubing radius ratio for the case of a 0.001 cm slip layer (Δr) comprised or a fluid with a power law index (n') of 0.52.

FIGS. 9 and 10 show the theoretical relationship (FIG. 9) and the resulting viscosity ratios (FIG. 10), when observed at the same apparent shear rate, as a function of radii ratio for a slip layer thickness of 0.001 centimeters with a slip fluid power law index (n') of 0.52. For the flow loop diameter ratio of 0.303/0.57, the predicted viscosity ratio would be only 0.72. FIG. 10 shows that larger differences would be predicted as R1/R2 varies more from unity. Interestingly, the viscosity ratio predicted for the Couette B1/B2 bob sizes is 0.5, which agrees well with the observed data in the low stress state in FIG. 8.

Figure 11:
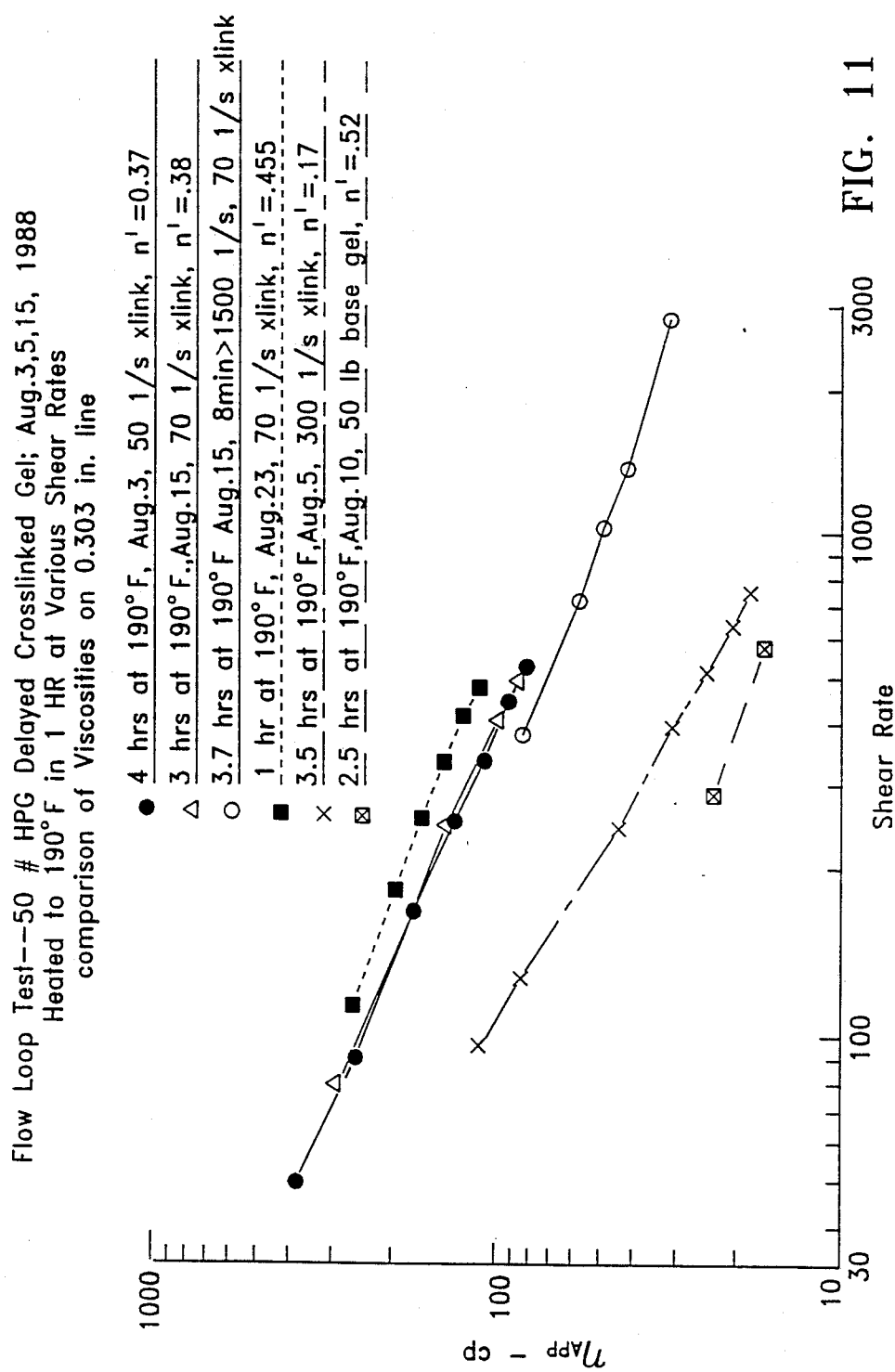
FIG. 11 is a plot of experimentally measured viscosities versus shear rate for a delayed cross-linked fluid which was crosslinked at various shear rates and tested in a tubular flow loop.
Figure 12:
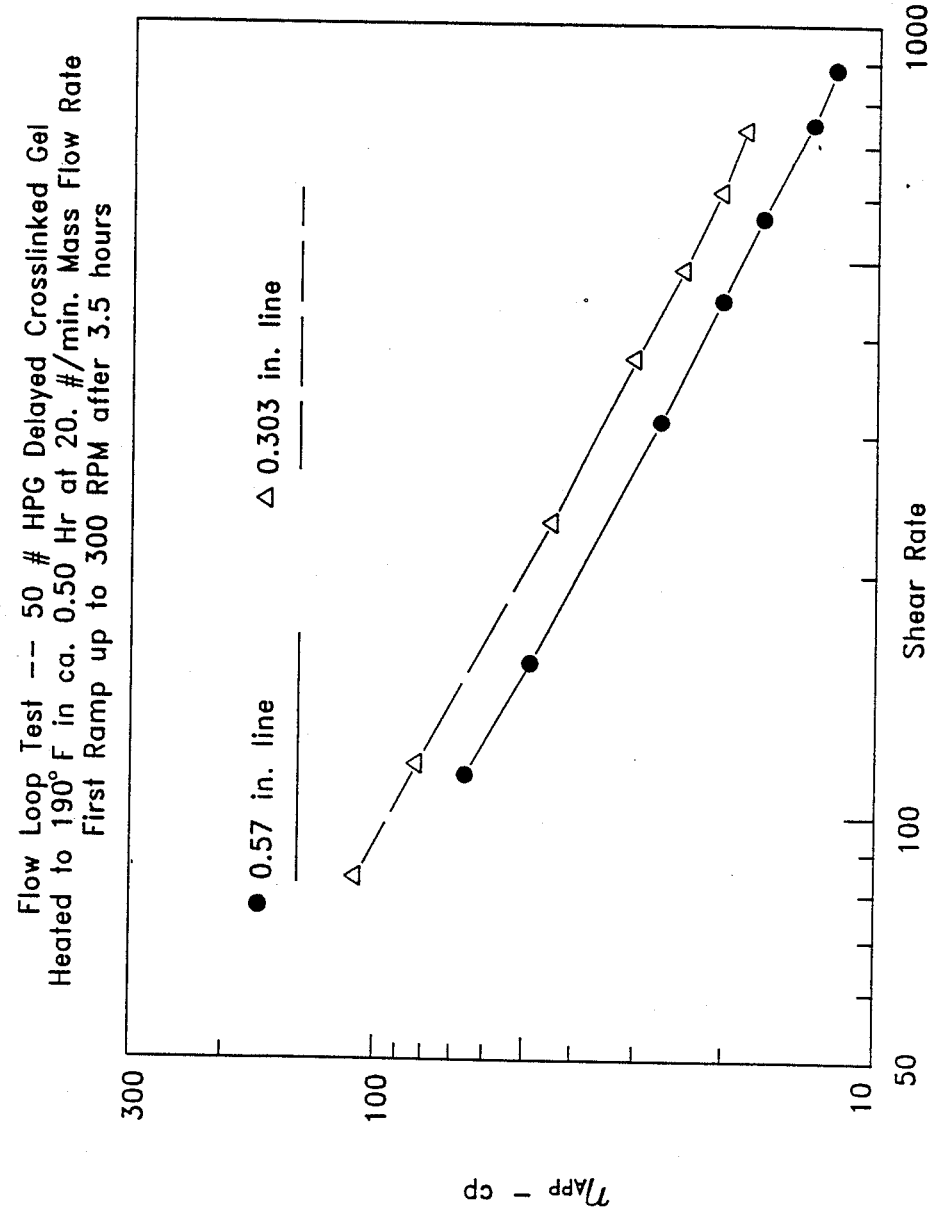
FIGS. 12 and 13 are plots of viscosity versus shear rate for one of the fluids tested in FIG. 11 at 3.5 and 5.0 hours, respectively after crosslinking at 300 1/s shear rate.
Figure 13:
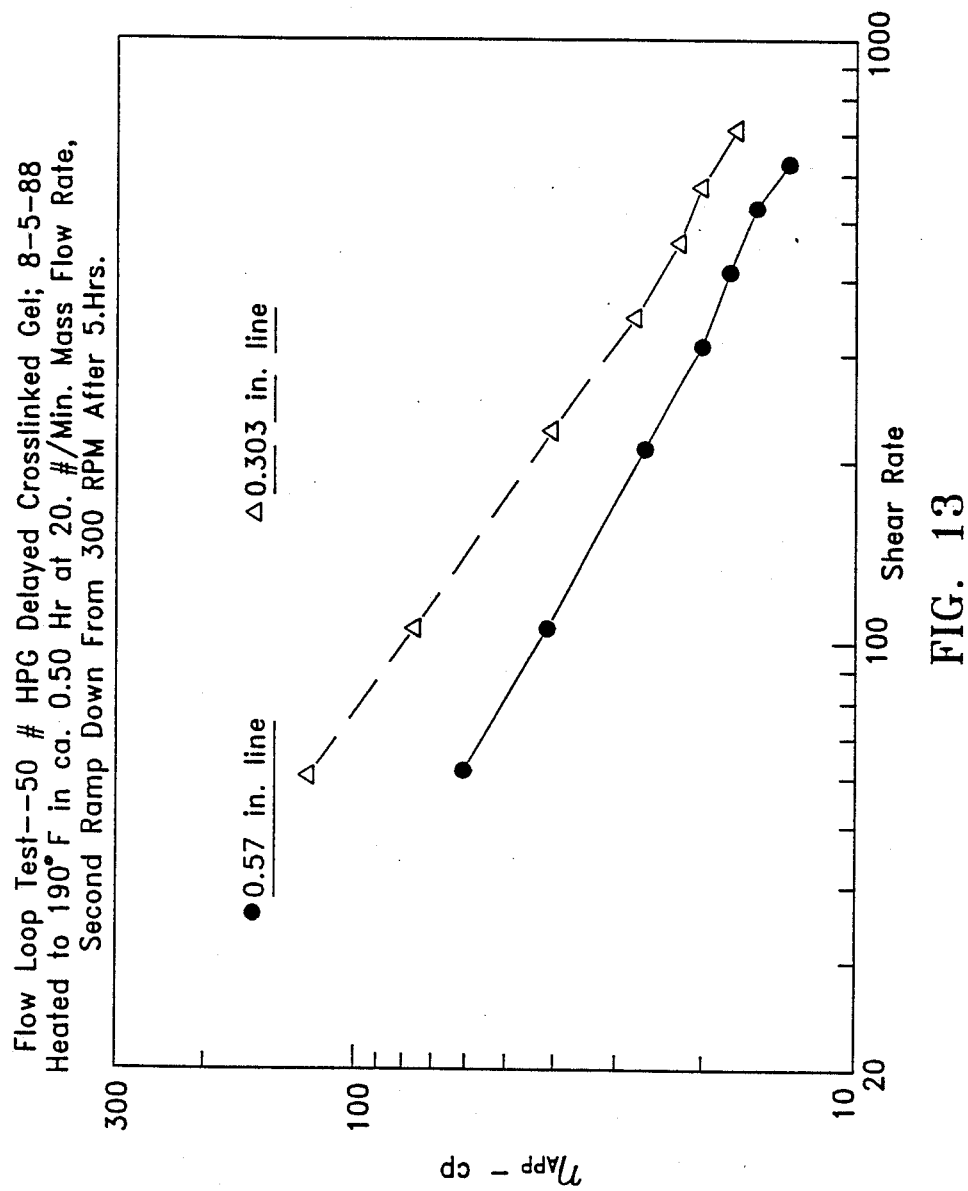

FIG. 11 shows 0.303 inch flow loop viscosities taken for fluids crosslinked at low shear rates (less than 75 1/s on August 3, 15, and 23), compared with those taken on August 5 for Versagel HT crosslinked at a nominal shear rate of 300 1/s. At first, one might think that the 300 1/s cross-link shear rate irreversibly degraded the gel, causing the resulting relatively low viscosities. However, there is evidence to the contrary. First, the power law index (n') for the August 5 data is only 0.17 compared with n's near 0.4 for the other tests. A shear degraded polymer would show higher n' because degraded polymers have a smaller molecular size, giving less entanglement coupling. Second, the August 15 fluid, when subjected t 8 minutes of shear rates near 3,000 1/s, still showed considerably higher viscosities than the August 5 data which never was exposed to shear rates greater than 750 1/s. Third, FIGS. 12 and 13 show that there is a substantial geometry effect (due to difference in flow loop tubing diameter) for the August 5 fluid that would not be expected for a shear degraded fluid. Thus, one may conclude that the August 5 tubular flow loop data is also showing apparent slip flow but with much lower viscosities than those observed from the August 23 fluid that is also expected to be in apparent slip flow.

The difference between the two apparent slip flows is believed to be in the character of the gel-solid central portions. It is contemplated that the fluids crosslinked at less than 75 1/s may yield a more tightly crosslinked central portion than those crosslinked at 300 1/s. As a result, when in apparent slip flow in the low stress state, the slip layer may be wider in the fluids crosslinked at a higher shear rate because the gel-solid portion is more eroded near the tube walls. Erosion would also give smaller n' values. However, in both cases, perfect proppant transport would be achieved in the gelled central regions. Support for this is also discussed supra, where analogous behavior was seen in FIGS. 3–6, which provided the basis for the disclosure that optimal cross-link shear energies exist, giving minimal viscosities in apparent slip flow.

While presently preferred embodiments of the invention have been described herein for the purpose of disclosure, numerous changes in the construction and arrangement of parts in the performance of steps will suggest themselves to those skilled in the art, which changes are encompassed within the spirit of this invention as defined by the appended claims.

What is claimed is:

1. A method of flowing a high viscosity substance through a conduit at a low apparent viscosity, which comprises the steps of:
   selecting a cross-linkable fluid having nonhomogeneous flow properties; and
   flowing the fluid through the conduit at fluid conditions which produce nonhomogeneous flow of the fluid at a low apparent viscosity.

2. The method of claim 1, further comprising the step of:
   determining the fluid conditions at which the fluid flows nonhomogeneously at a low apparent viscosity.

3. The method of claim 1, in which the flowing step comprises:
   flowing the fluid through the conduit at the fluid conditions which produce nonhomogeneous flow at a minimal apparent viscosity.

4. The method of claim 1, in which the flowing step comprises:
   flowing the fluid through the conduit at the fluid conditions which produce apparent slip flow at a minimal apparent viscosity.

5. The method of claim 1, which further comprises the steps of:
   crosslinking the fluid while inputting shear energy to the fluid;
   determining the ranges of shear energy input to the fluid which produce nonhomogeneous flow of the fluid at a low temperature viscosity; and
   flowing the fluid at flow rates which create fluid shear energies within the ranges determined in the previous step.

6. The method of claim 1, which further comprises the steps of:
   crosslinking the fluid while inputting shear energy to the fluid;
   determining the ranges of shear energy input to the fluid which yield nonhomogeneous flow at minimal apparent viscosities; and
   flowing the fluid at flow rates which create fluid shear energies within the ranges determined in the previous step.

7. The method of claim 1, further comprising the steps of:
   crosslinking the fluid at various selected cross-link shear rates;
   measuring the shear stress and apparent viscosity of the cross-linked fluid at various selected shear rates; and
   determining the cross-link shear rate which produces nonhomogeneous flow of the cross-linked fluid at minimal apparent viscosities.

8. The method of claim 1, further comprising the step of: crosslinking the fluid at a shear rate which produces nonhomogeneous flow of the cross-linked fluid at a minimal apparent viscosity, the fluid being crosslinked while flowing through the conduit.

9. A method of flowing a high viscosity substance in a preselected zone of a conduit at a low apparent viscosity, which comprises the steps of:
   determining the temperature in the preselected zone of conduit;
   selecting a delayed cross-linkable fluid having nonhomogeneous flow properties which is crosslinked at the temperature in the preselected zone of conduit;
   determining the fluid conditions at which the fluid flows nonhomogeneously at a low apparent viscosity in the preselected zone of conduit; and
   flowing the fluid through the zone of conduit at the fluid conditions which produce nonhomogeneous flow of the fluid at a low apparent viscosity.

10. The method of claim 9 in which the flowing step comprises:
flowing the fluid through the zone of conduit at the fluid conditions which produce nonhomogeneous flow at a minimal apparent viscosity.

11. The method of claim 9, which further comprises the steps of:
crosslinking the fluid while inputting shear energy to the fluid;
determining the ranges of shear energy input to the fluid which produce nonhomogeneous flow of the fluid at a low apparent viscosity; and
flowing the fluid in the zone of conduit at flow rates which create fluid shear energies within the ranges determined in the previous step.

12. The method of claim 9, which further comprises the steps of:
crosslinking the fluid while inputting 0 shear energy to the fluid;
determining the ranges of shear energy input to the fluid which produce nonhomogeneous flow at minimal apparent viscosities; and
flowing the fluid in the zone of conduit at flow rates which create fluid shear energies within the ranges determined in the previous step.

13. The method of claim 9, which further comprises the steps of:
crosslinking the fluid at various selected cross-link shear rates;
measuring the shear stress and apparent viscosity of the cross-linked fluid at various selected shear rates; and
determining the cross-link shear rates which produce nonhomogeneous flow at minimal apparent viscosities.

14. The method of claim 9, which further comprises the step of:
crosslinking the fluid at a shear rate which produces nonhomogeneous flow at a minimal apparent viscosity, the fluid being crosslinked while flowing in the preselected zone of conduit.

15. A method of nonhomogeneously flowing a high viscosity fracturing gel in a well fracture at a low apparent viscosity and a high proppant carrying ability, which comprises the steps of:
determining the temperature in the fracture;
selecting a delayed cross-linking fluid having nonhomogeneous flow properties which is crosslinked at or above the temperature in the fracture but below ambient temperature;
determining the fluid conditions at which the fluid nonhomogeneously flows at a low apparent viscosity in the fracture; and
flowing the fluid in the fracture at the fluid conditions which produce nonhomogeneous flow of the fluid at a low apparent viscosity.

16. The method of claim 15 in which the flowing step comprises:
flowing the fluid in the fracture at the fluid conditions which produce nonhomogeneous flow at a minimal apparent viscosity.

17. The method of claim 15, which further comprises the steps of:
crosslinking the fluid while inputting shear energy to the fluid;
determining the ranges of shear energy input to the fluid which produce nonhomogeneous flow of the fluid at a low apparent viscosity;
flowing the fluid in the fracture at flow rates which create fluid shear energies within the ranges determined in the previous step.

18. The method of claim 15, which further comprises the steps of:
crosslinking the fluid while inputting shear energy to the fluid;
determining the ranges of shear energy input to the fluid which produce nonhomogeneous flow at minimal apparent viscosities; and
flowing the fluid in the fracture at flow rates which create fluid shear energies within the ranges determined in the previous step.

19. The method of claim 15, in which the flowing step comprises:
crosslinking the fluid in the fracture at a shear rate which produces nonhomogeneous flow at a minimal apparent viscosity.

20. The method of claim 15, which further comprises the steps of:
adding proppant to the fluid; and
nonhomogeneously flowing the fluid and proppant in the fracture.

21. A method of determining whether a crosslinked gel which can contain proppant or a suitable proppant substitute will flow at low apparent viscosities, comprising the steps of:
crosslinking the fluid while inputting shear energy to the fluid;
determining whether there are ranges of shear energy input to the cross-linked fluid while crosslinking the fluid which produce nonhomogeneous flow of the fluid at a low apparent viscosity.

22. A method of determining whether a cross-linked gel which can contain proppant or a suitable proppant substitute will flow at low apparent viscosities, comprising the steps of:
crosslinking the fluid at various selected cross-link shear rates;
measuring the shear stress and apparent viscosity of the cross-linked fluid at various selected shear rates; and
determining whether there are cross-link shear rates which produce nonhomogeneous flow at low apparent viscosities.

23. A method of determining whether a crosslinked gel which can contain proppant or a suitable proppant substitute will flow at low apparent viscosities, comprising the steps of:
crosslinking the fluid at various selected cross-link heating rates;
crosslinking the fluid at various selected cross-link shear rates at each of the selected crosslink heating rates;
measuring the shear stress and apparent viscosity of the cross-linked fluid at various selected shear rates; and
determining whether there are combinations of cross-link heating rate and cross-link shear rate which produce nonhomogeneous flow at low apparent viscosities.

* * * * *